United States Patent [19]
Sugihara

[11] Patent Number: 5,897,734
[45] Date of Patent: Apr. 27, 1999

[54] METHOD FOR PRODUCING A COVERING

[75] Inventor: Shozo Sugihara, Hiroshima, Japan

[73] Assignee: Sugihara Housei Kogyo Co., Ltd., Hiroshima, Japan

[21] Appl. No.: 08/757,551

[22] Filed: Nov. 27, 1996

[30] Foreign Application Priority Data

Nov. 30, 1995 [JP] Japan ................................ 7-312560
Jul. 25, 1996 [JP] Japan ................................ 8-196769

[51] Int. Cl.⁶ ................................................ B29C 65/00
[52] U.S. Cl. ...................... 156/228; 156/285; 156/306.6; 156/322; 156/327
[58] Field of Search .................................. 264/316, 324, 264/322, 546, 544, 257, 258; 156/228, 285, 306.6, 322, 327

[56] References Cited

U.S. PATENT DOCUMENTS

| 2,915,427 | 12/1959 | Schriner et al. | 264/546 |
|---|---|---|---|
| 3,673,034 | 6/1972 | Squier | 156/222 |
| 4,141,967 | 2/1979 | Osberghaus et al. | |
| 4,172,123 | 10/1979 | Lowicki | 424/67 |
| 4,780,361 | 10/1988 | Schlein | 428/287 |
| 4,946,640 | 8/1990 | Nathoo | 264/546 |
| 5,254,386 | 10/1993 | Simpson et al. | 428/95 |
| 5,354,553 | 10/1994 | Greczyn | 424/65 |
| 5,376,362 | 12/1994 | Murphy et al. | 424/66 |
| 5,593,631 | 1/1997 | Hara et al. | 264/257 |
| 5,656,357 | 8/1997 | Ogata et al. | 264/257 |

FOREIGN PATENT DOCUMENTS

| 27 06 446 | 11/1977 | Germany. |
|---|---|---|
| 93 09 926 | 9/1993 | Germany. |
| 295 05 095 | 5/1995 | Germany. |
| 1 325 203 | 8/1973 | United Kingdom. |
| 2 259 449 | 3/1993 | United Kingdom. |
| WO 89 04760 | 6/1989 | WIPO. |

*Primary Examiner*—Christopher A. Fiorilla
*Attorney, Agent, or Firm*—Fish & Richardson PC

[57] ABSTRACT

A covering is produced by placing a green web including an air-containing fabric layer having a first thickness and a surface layer in a mold having a predetermined shape, and compressing the green web into the predetermined shape such that the air-containing fabric layer and the surface layer unite to each other while the air-containing fabric layer reduces to a second thickness smaller than the first thickness. The resulting compressed green web has a solidity that holds the predetermined shape.

8 Claims, 11 Drawing Sheets

FIG. 5
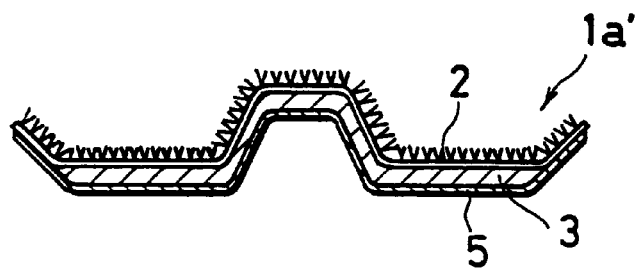
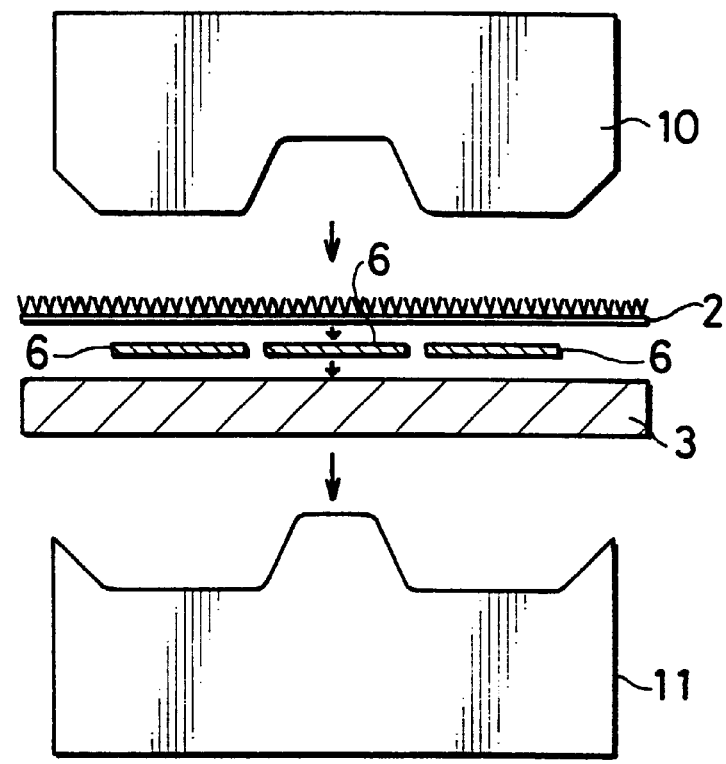
FIG. 6A
FIG. 6B
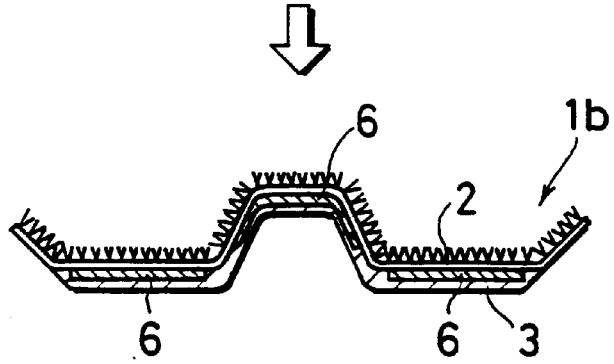

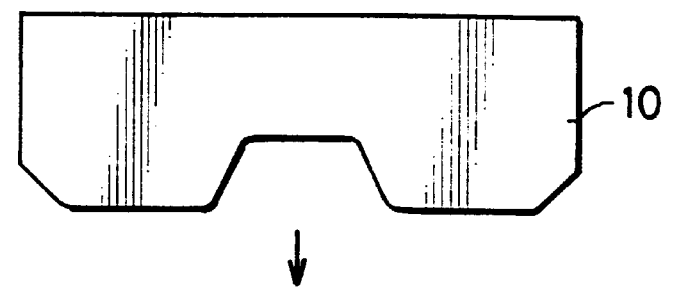
FIG. 11A
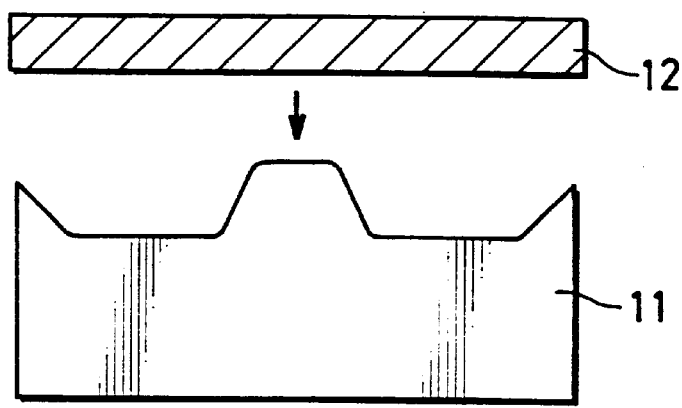

METHOD FOR PRODUCING A COVERING

BACKGROUND OF THE INVENTION

This invention relates to a covering such as a floor mat to be placed on a floor portion of an automotive vehicle and the like, and a method for producing a covering.

There has been known a conventional covering comprising a surface layer such as a carpet and a backing layer such as a felt which is placed on an underside surface of the surface layer. In such covering, the backing layer gives an effect of absorbing sound and insulating heat.

The above-mentioned covering exhibits better sound absorbing and heat insulating effect when being placed on the automotive floor in accordance with the shape of automotive floor. In an attempt to attain this purpose, there has been conducted a method of producing the covering shaped in accordance with the shape of automotive floor: in which a base layer of a surface layer (carpet) which is composed of, e.g., latex, polyethylene, polypropylene, vinylchloride, ethylene vinylacetate (EVA) resin and the like is heated with a heater, the surface layer together with the base layer is compressed and shaped in a mold in accordance with the shape of automotive floor, and then, a felt material (backing layer) which has been compressed to attain a certain hardness suitable for absorbing sound and insulating heat is adhered to an underside surface of the carpet, specifically, an underside surface of the base layer of the carpet. The above effects can be further improved by attaching additional members such as silencer and heat insulating member if such high performance of absorbing sound and insulating heat are to be sought.

However, the above method has been conducted mainly with human labor in which workers manually attach the backing layer onto the underside surface of the surface layer. This is not favorable in improving productivity and rather hinders the idea of enhancing productivity.

Another problem has been involved in the conventional method. Whereas the surface layer having a proper shape in accordance with the shape of automotive floor can be easily obtained according to the molding process, it is difficult to shape the backing layer in accordance with the shape of automotive floor because the backing layer is made of a felt. Accordingly, complicated and cumbersome manual operations are required in attaching the backing layer to the surface layer in accordance with the shape of automotive floor, lowering efficiency of attaching operation and resulting in an increase of production cost of the covering.

To solve the above problem, generally, the following method shown in FIG. 14 has been carried out. In this method, a backing layer 22 is attached to essential part of a surface layer 21 discontinuously to obtain a covering 20. In other words, the backing layer 22 is attached to at least some portions of the surface layer 21 where attaching is regarded to be essential in absorbing sound and insulating heat. Thus, efforts have been made to maintain efficiency of producing the covering at a certain level (avoiding cumbersome attaching operation), while maintaining the functions as a covering (sound absorbance and heat insulation).

However, accompanied by recent demands of seeking comfortable riding in an automotive vehicle, there has been a great demand for higher performance of absorbing sound and insulating heat. Accordingly, the conventional covering having been partially attached with the backing layer on the surface layer does not suffice this demand, and an improved covering has been demanded.

Also, provision of additional members such as silencer and heat insulating member raises the production cost and produces a bulky covering. Accordingly, there is a demand for a covering capable of improving the effect of sound absorbance and heat insulation without the provision of dedicated silencer and heat insulating member.

SUMMARY OF THE INVENTION

In view thereof, it is an object of the present invention to provide a covering and a method for producing a covering which has overcome the problems residing in the prior art.

It is another object of the present invention to provide a covering and a method for producing a covering having high performance of absorbing sound and insulating heat and high productivity.

One aspect of the present invention is directed to a covering comprising: a first layer; and a second layer integrally connected attached to the first layer, the second layer including a compressed air-containing fabric.

In another aspect of the present invention, at least one of the first and second layers is made of a thermosetting resin.

In yet another aspect -of the present invention, at least one of the first and second layers is made of a thermoplastic resin.

With this construction, since the green web can be easily shaped, the covering can be shaped exactly in accordance with the shape of a floor of transportation means.

In still further aspect of the present invention, the covering further comprises a water proof sheet material between the first and second layers.

With this construction, water can be assuredly prevented from being intruded into the covering.

In yet another aspect of the present invention, the first layer includes a sound absorbable material (silencer).

With this construction, a sound absorbing effect of the covering can be improved.

In still another aspect of the present invention, the second layer includes a plurality of air-containing fabrics.

With this construction, the partial use of a fabric suitable to a particular portion of the covering enables reduction of production costs of covering, while securing the effect of sound absorbance.

It should be appreciated that the use of a plurality of fabrics includes the use of fabrics different in terms of material and structure.

In another aspect of the present invention, the first layer includes a deodorant material.

In still another aspect of the present invention, the first layer includes a fabric coated with a deodorant material.

With these constructions, a deodorizing effect can be given to the covering, as well as effects of absorbing sound and insulating heat. It should be appreciated that the deodorizing effect includes fragrance effect, and the deodorant material includes a deodorizing agent and fragrance agent.

In still another aspect of the present invention, the covering further comprises a hook portion.

With this construction, the hook portion of the covering obviates additionally mounting a hook to the covering, and accordingly, reduces the production cost of covering.

The present invention is further directed to a method for producing a covering, comprising: placing a green web including an air-containing fabric layer in a mold having a predetermined shape; and compressing the green web into the predetermined shape in such a way that the air-containing fabric layer has a predetermined hardness.

In another aspect of the present invention, the mold includes a pair of a male member and a female member, and the mold has been heated to a predetermined temperature.

In yet another aspect of the present invention, the mold includes a pair of a male member and a female member, and the green web is heated to a predetermined temperature before the compressing.

In still further aspect of the present invention, the mold includes a vacuum device for compressingly drawing the green web onto a molding surface of the mold, and the green web is heated to a predetermined temperature before the compressing.

In still another aspect of the present invention, the mold includes an air supplier for compressingly supply air onto the green web placed in the mold, and the green web is heated to a predetermined temperature before the compressing.

According to these methods, the green web can be shaped into the predetermined shape of the mold (in accordance with the shape of a floor of transportation means such as automotive vehicles), while the air-containing fabric layer being compressed to the predetermined hardness suitable for absorbing sound and insulating heat. Accordingly, the number of processes required for producing the covering can be reduced, while improving productivity of the covering.

In another aspect of the present invention, the green web further includes another layer, and an adhesive material between the layers.

According to this method, connection between the layers of the green web can be strengthened. Further, this method is advantageous in the case that the green web comprises a fabric layer incapable of curing and fusing itself.

In still another aspect of the present invention, the green web further includes a deodorizing layer having a fabric coated with a deodorant material, the fabric being coated with the deodorant material by one of spraying, roll-coating, and dipping.

In yet another aspect of the present invention, the fabric is coated with a solution of the deodorant material, and is heated.

According to these methods, the covering comprising the first layer including the fabric coated with the deodorant material is obtainable in a favorable manner.

In yet another aspect of the present invention, the mold is formed with a hook.

According to this method, the hook portion of the covering can be formed at the same time of shaping the covering in the mold, thereby improving the productivity of covering.

In further aspect of the present invention, the green web further includes another layer, at least one of the layers being added with an adhesive material of thermosetting resin.

In another aspect of the present invention, the green web further includes another layer, at least one of the layers being added with an adhesive material of thermoplastic resin.

In yet another aspect of the present invention, the green web further includes another layer, at least one of the layers being added with an adhesive material of foam resin.

According to these methods, similar to the case that the green web further includes another layer, and an adhesive material between the layers, connection between the layers can be strengthened. In particular, in the case that the adhesive material of foam resin is added, a flexible and soft covering is obtainable.

These and other objects, features and advantages of the present invention will become more apparent upon a reading of the following detailed description and accompanying drawings.

BRIEF DESCRIPTION OF THE DRAWINGS

FIG. 5 is a sectional view of an altered form of covering obtainable by the method shown in FIG. 4A;

FIG. 6A is a diagram illustrating still another altered method for producing the covering;

FIG. 6B is a cross sectional view of the covering obtained by the method in FIG. 6A;

FIG. 11A is a diagram illustrating yet another altered method for producing the covering;

DETAILED DESCRIPTION OF THE PREFERRED EMBODIMENTS OF THE INVENTION

A preferred embodiment according to the present invention is described with reference to the accompanying drawings.

Figure 1:
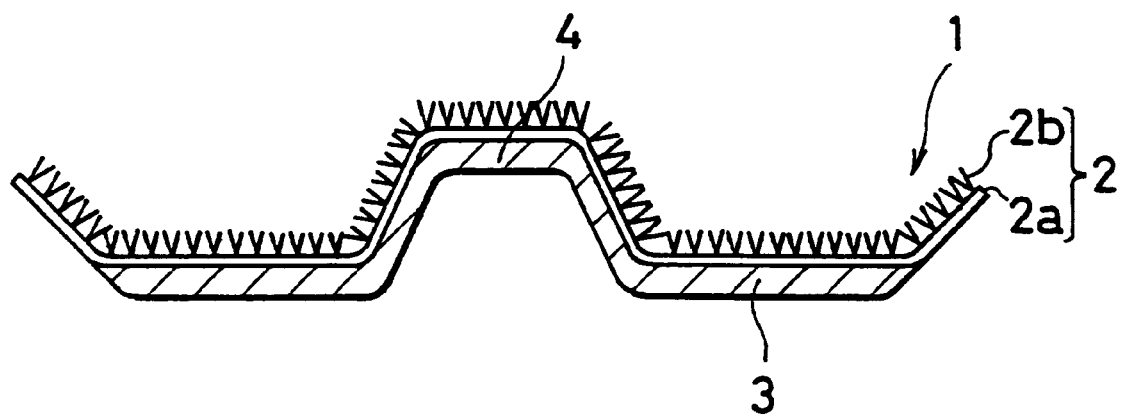
FIG. 1 is a cross sectional view of a covering as an embodiment according to the present invention.

FIG. 1 is a cross sectional view showing a covering 1 embodying the present invention. The covering 1 which is to be placed on a floor portion of an automotive vehicle comprises a surface layer 2 such as a carpet and a backing layer 3 which is fixedly attached to an underside surface of the surface layer. The surface layer 2 is composed of fabric made of a thermoplastic resin such as polyester (saturated polyester), vinylchloride, polyethylene, and polypropylene. The covering 1 is further provided with a curved portion 4 in the middle thereof, as shown in FIG. 1. The curved portion 4 has an inverted U-shape in cross section and corresponds to a tunnel portion in the floor of the automotive vehicle. As shown in FIG. 1, the surface layer 2 comprises a base layer 2a and a tuft portion 2b. The tuft portion 2b has a structure of cut pile, but may have a structure of loop pile.

The backing layer 3 is composed of an air containing fabric layer made of a thermoplastic resin such as polyester. The backing layer 3 is fixedly attached to the surface layer 2 substantially over its entirety in a compressed state to attain a certain hardness suitable for absorbing sound and insulating heat. It should be appreciated that opposite ends of the surface layer 2 (right and left sides in FIG. 1) are compressed to a certain extent and are formed into a thin plate-like shape.

Figure 2A:
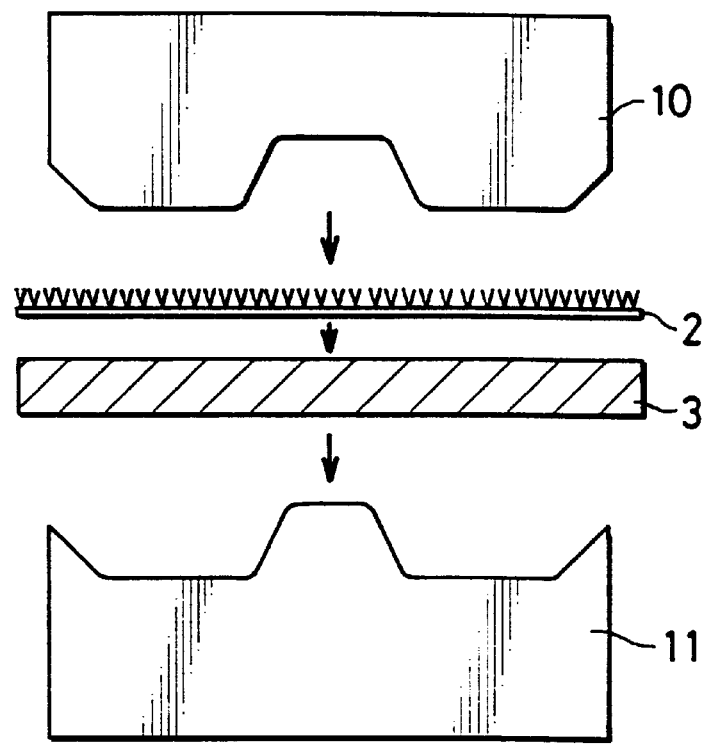
FIGS. 2A and 2B are diagrams illustrating a method for producing the covering.
Figure 2B:
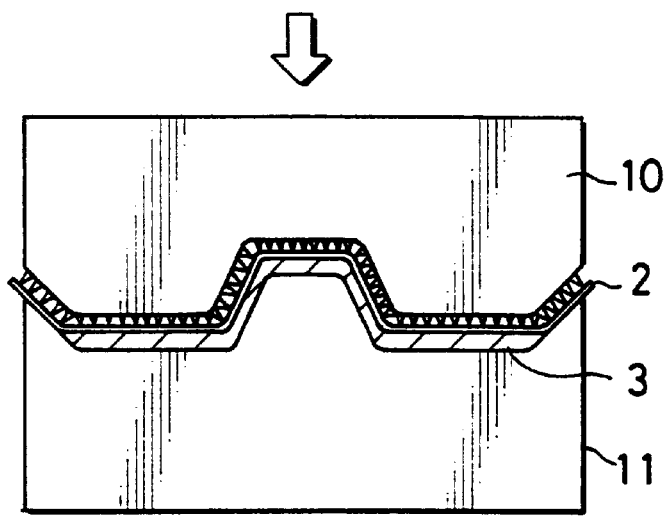
Figure 2C:
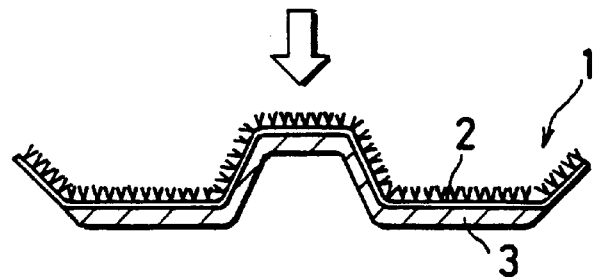
FIG. 2C is a cross sectional view of the covering obtained by the method shown in FIGS. 2A and 2B.

The covering 1 having the above construction is produced according to the following method. As shown in FIG. 2A, the surface layer 2 and backing layer 3 each in a form of sheet are placed one over the other to form a double-layered member (hereinafter referred to as a "green web"). The thus formed green web is placed on a lower mold (male mold) 11 which is heated at a specified temperature in advance. Thereafter, an upper mold (female mold) 10 is lowered to enclose the green web inside the upper and lower molds (see FIG. 2B), and the green web is pressurized at a specified pressure for a predetermined time period. Thereby, the surface layer 2 and the backing layer 3 are fused to each other in the pressurized heated state and shaped into a specified form. Thus, the covering 1 is produced, while the backing layer 3 is compressed to attain the certain hardness (see FIG. 2C).

In this embodiment, the covering I having high performance of absorbing sound and insulating heat was obtained using the surface layer 2 (300 g/m$^2$) and backing layer 3 (1000 g/M$^2$) each made of polyester fiber in a state that the upper mold 10 and lower mold 11 are respectively kept at a temperature in the range of 40 to 140° C. and in the range of 145 to 230° C. and the surface layer and backing layer are pressurized under a pressure of 0.5 to 5 kg/cm$^2$ for 15 to 30 seconds.

Since being made of a thermoplastic resin and thus feasible in shaping, the backing layer 3 can be evenly attached to the underside surface of the surface layer 2 over its entirety, as shown in FIG. 1, while being uniformly compressed in the molds. Accordingly, the covering 1 with the backing layer 3 evenly attached to the surface layer 2 can attain high performance of absorbing sound and insulating heat, compared to the conventional covering in which the backing layer is discontinuously (unevenly) attached.

Further, as mentioned above, the surface layer 2 and the backing layer 3 are compressingly shaped into a specified form by compression molding in a state that the surface layer 2 is placed over the backing layer 3. Thereby, the surface layer 2 and the backing layer 3 are integrally connected to each other, while being shaped into the specified form. At the same time when fusing the surface layer and the backing layer, the backing layer 3 is compressed to attain a certain hardness. Accordingly, in the present invention, the processes of shaping the surface layer, compressing the backing layer, and attaching the backing layer onto the surface layer can be performed at the same time, whereas, in the conventional method, these processes are conducted individually.

The above method according to the present invention remarkably reduces the number of processes required for producing the covering 1, thereby improving productivity of the covering. In particular, the conventional production method has faced the complicated and cumbersome attaching operations in an attempt to obtain the backing layer having the shape identical to the surface layer. However, the inventive production method can obviate these cumbersome and complicated attaching operations. Accordingly, the inventive method is advantageous in improving the productivity of covering.

In the foregoing embodiment, the backing layer and surface layer are placed one over the other in shaping the green web by the molding process. Alternatively, the surface layer 2 and the backing layer 3 may be adhered to each other prior to the shaping.

In the foregoing embodiment, the covering 1 is obtained by, e.g., hot press molding in which the surface layer 2 and the backing layer 3 are compressed and shaped in a heated mold. Alternatively, the covering 1 may be obtained by e.g., cold press molding in which a green web of surface layer 2 and backing layer 3 is heated with a heater in advance, and then, the heated green web is compressed and shaped in a mold.

Alternatively, other than the above-mentioned compression molding, so-called "vacuum forming" and "air pressure forming" can be conducted to produce the covering 1. Specifically, in the vacuum forming, a green web of surface layer 2 and backing layer 3 is heated with a heater and then shaped by being pressingly brought into contact with the upper female mold 10 or lower male mold 11, while drawing the air between the upper (lower) mold and the green web by a vacuum pump. In the air pressure forming, a green web of surface layer 2 and backing layer 3 is heated with a heater and then shaped by being pressingly brought into contact with the upper (lower) mold, while being pressurized with air being blown onto the green web.

Further, the covering 1 can take various alterations other than the aforementioned embodiment, and some of the alterations are briefly described hereafter. These alterations can also be shaped by vacuum forming or air pressure forming. For the sake of convenience on the description, however, the following alterations are to be produced by the compression shaping.

First Alteration

Figure 3A:
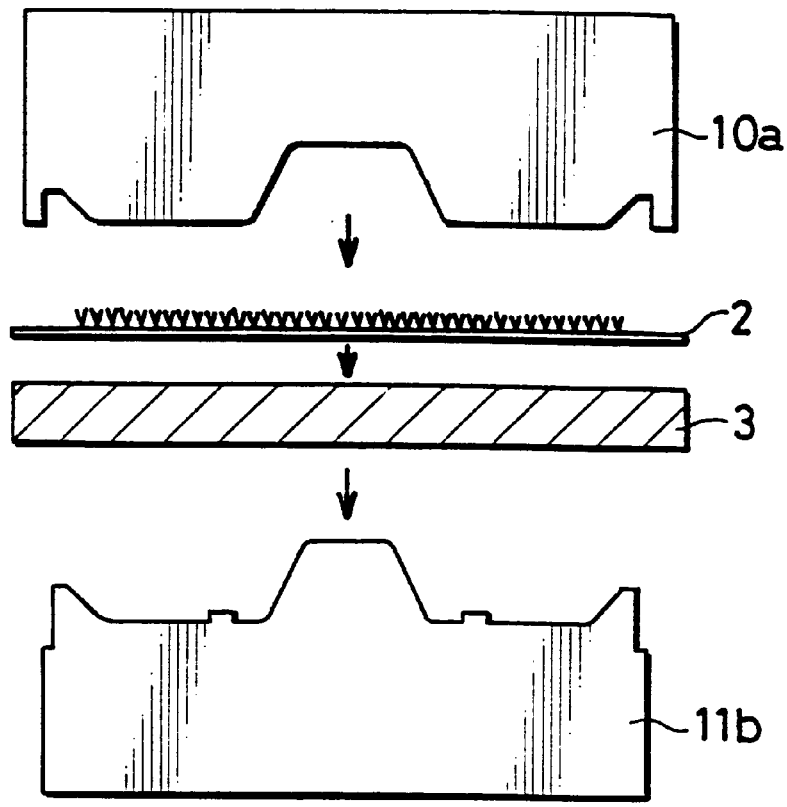
FIG. 3A is a diagram illustrating an altered method for producing the covering.
Figure 3B:
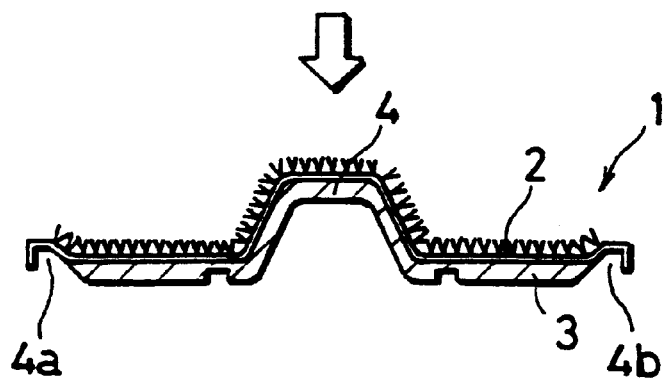
FIG. 3B is a cross sectional view of the covering obtained by the altered method in FIG. 3A.

The first alteration is such that the covering 1 is formed with hooks 4a and 4b at opposite ends thereof to be hooked with a floor portion of an automotive vehicle, as shown in FIG. 3B, with use of upper (female) mold 10a and lower (male) mold 11b shown in FIG. 3A.

This arrangement not only obviates provision of additional hooks to the covering 1 but is advantageous in that the hooks 4a and 4b can be formed at the same time of compression shaping of a green web comprising the surface layer and backing layer. Accordingly, the production cost can be further reduced, and productivity can be improved.

In forming the hook 4a (4b), it may be preferable to separately provide a mold (hook mold) for forming the hook in a mold main body so that the hook mold can be heated at a higher temperature so as to accelerate curing of the hook 4a (4b). With this arrangement, the hooks 4a and 4b of greater strength can be obtained.

Further, it may be preferable to additionally provide a plate-like member which has a specified dimension and is made of a thermoplastic resin such as polypropylene or a thermosetting resin such as uncured phenol impregnated felt, to the green web in compressingly molding the green web. With the provision of plate-like member, the hooks can be integrally formed with the covering.

Second Alteration

Figure 4A:
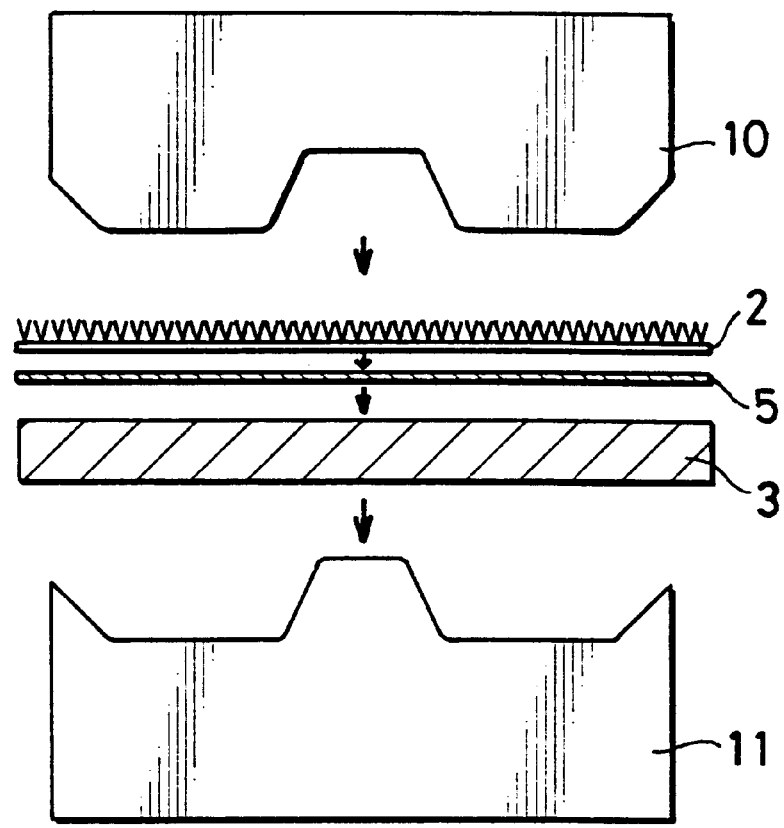
FIG. 4A is a diagram illustrating another altered method for producing the covering.
Figure 4B:
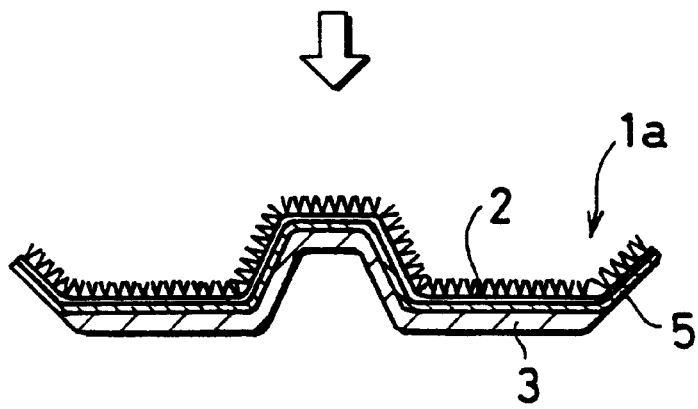
FIG. 4B is a cross sectional view of the covering obtained by the another altered method in FIG. 4A.

In this alteration, as shown in FIG. 4A, a silencer 5 in a form of sheet and made of polyvinyl chloride is interposed between the surface layer 2 and the backing layer 3. In a state that the silencer 5 is sandwiched between the layers 2 and 3, a green web of surface layer and backing layer is compressingly shaped in a mold which is heated at a predetermined temperature in advance. Thereby, as shown in FIG. 4B, a covering 1a having higher performance of absorbing sound is obtained.

Alternatively, other than the above method of interposing the silencer 5 between the surface layer 2 and the backing layer 3 and shaping the green web of surface layer and backing layer together with the silencer according to the compression shaping, the following methods can be adopted. Specifically, the silencer 5 may be placed at an underside surface of the backing layer 3, and the green web of surface layer and backing layer may be shaped according to the compression molding to produce a covering 1a' shown in FIG. 5. In this case, also, the covering 1a' having higher performance of absorbing sound can be obtained.

Third Alteration

As an alteration of the covering shown in FIG. 4B, a covering 1b can be produced in the following manner. As shown in FIG. 6A, pieces of silencers 6 are arranged side by side between the surface layer 2 and the backing layer 3, and a green web of surface layer and backing layer with the silencers 6 interposed therebetween is shaped according to the compression shaping in a mold which is heated at a predetermined temperature in advance. Thus, the covering 1b shown in FIG. 6B can be obtained.

Figure 7:
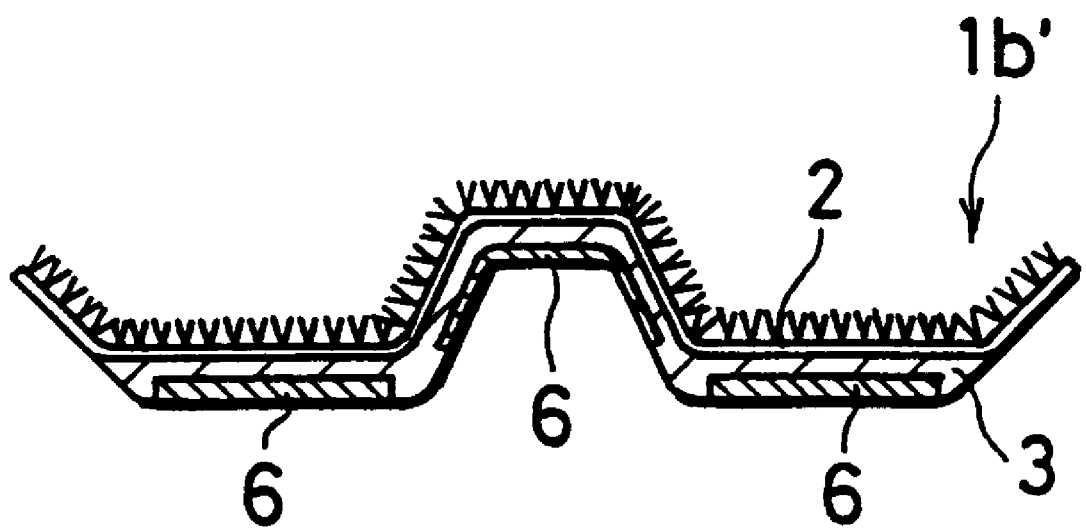
FIG. 7 is a cross sectional view of an altered form of covering obtainable by the method shown in FIG. 6A.

With this arrangement, the covering 1b having higher performance of absorbing sound can be obtained. Further, the provision of silencers 6 reduces the production cost of covering. Alternatively, the silencers 6 may be placed on the underside surface of the backing layer 3, and the green web of surface layer and backing layer together with the silencers is shaped according to the compression molding, thereby producing a covering 1b' shown in FIG. 7.

Fourth Alteration

Figure 8A:
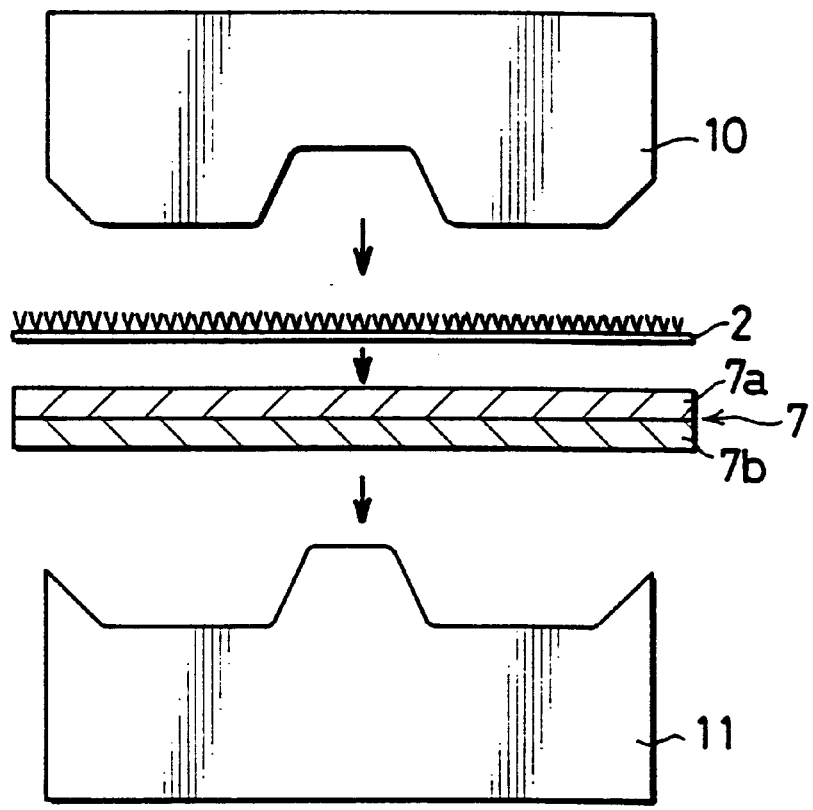
FIG. 8A is a diagram illustrating yet another altered method for producing the covering.
Figure 8B:
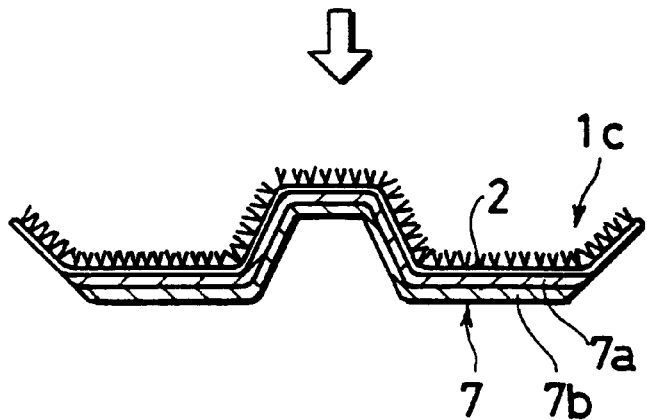
FIG. 8B is a cross sectional view of the covering obtained by the method in FIG. 8A.

As shown FIG. 8A, a backing layer 7 composed of fabric layers 7a and 7b which are different in fabric material from each other is placed at an underside surface of the surface layer 2 to form a green web, and the green web is compressingly shaped in a mold which is heated at a predetermined temperature in advance, thereby producing a covering 1c shown in FIG. 8B.

In this case, the fabric layers 7a and 7b are respectively made of polyester fiber and polyethylene fiber, both of which can be obtained at a relatively low cost. Accordingly, the production cost of covering composed of these inexpensive materials can be effectively reduced. Instead of using fabric of polyester and polyethylene fiber, an air containing fabric may be applicable. Since the air containing fabric can also be obtained at a low cost, the production cost of covering can also be reduced.

Further, a plurality of fabric layers excellent in absorbing sound may be placed one over another to produce a covering. Thereby, the covering excellent in absorbing sound can be produced without using a silencer. It is possible to obtain a light-weighted covering with such fabric layers provided therein, compared to the case where the covering is provided with a silencer in attaining the same sound absorbance level.

Fifth Alteration

Figure 9A:
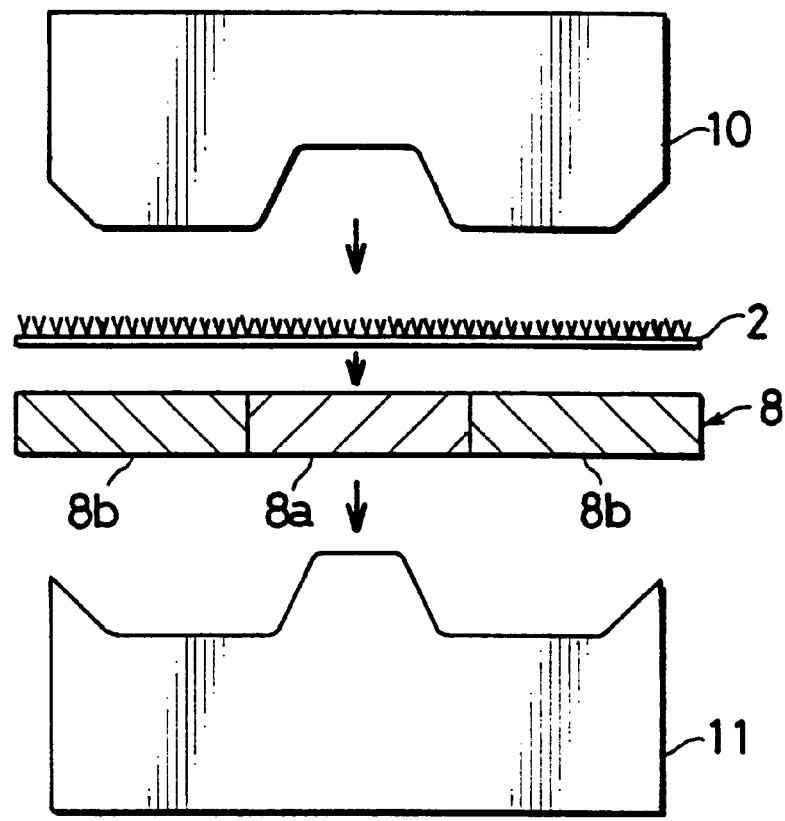
FIG. 9A is a diagram illustrating still further altered method for producing the covering.
Figure 9B:
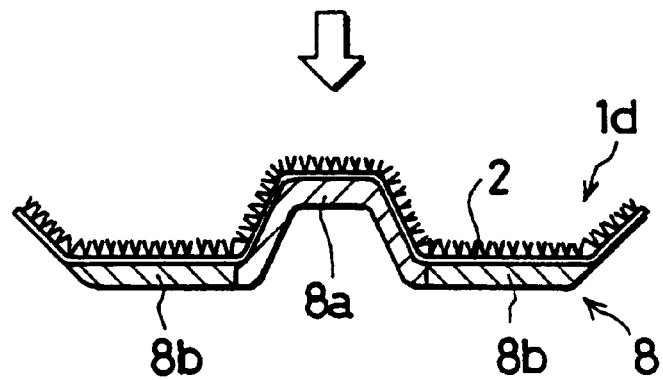
FIG. 9B is a cross sectional view of the covering obtained by the method in FIG. 9A.

As shown in FIG. 9A, a plurality of strip-like fabric layers 8a and 8b are connected to one another in patchwork manner in a widthwise direction of the surface layer to form a backing layer 8. The thus formed backing layer 8 and surface layer 2 are placed one over the other to form a green web, and the green web is shaped in a mold which is heated at a predetermined temperature in advance according to compression molding. Thereby, a covering 1d shown in FIG. 9B can be produced.

In this case, one of the fabric layers 8a and 8b constituting the backing layer 8 may be a fabric obtainable at a relatively low cost. Thereby, the covering 1d can be produced at a lower cost, as well as the covering 1c shown in FIG. 8B. Further, in the case where the covering is required to partially have high performance in absorbing sound and insulating heat, the covering may be provided with fabric layers made of a material of high sound absorbance and heat insulation at portions requiring such high performance. Thus, a covering exhibiting high performance of sound absorbance and heat insulation can be produced, while suppressing the production cost.

Various coverings described with reference to FIGS. 1 to 9B are produced in such a manner that the surface layer 2 and backing layer 3 are both composed of fabric made of a thermoplastic resin. Alternatively, the surface layer 2 and backing layer 3 may be composed of fabric made of a thermosetting resin. In this case, it is desirable to set a temperature at which a mold is to be heated low to suppress a drastic curing of the surface layer 2 and backing layer 3 as much as possible.

Further, besides the case that the surface layer 2 and backing layer 3 are made of the same resin, the surface layer 2 and backing layer 3 may be formed of a fabric made of resins different from each other, e.g., thermoplastic resin and thermosetting resin. In this case, a temperature at which the mold is to be heated is minutely adjusted.

In the case where an automotive floor on which the covering is to be placed has a relatively simple configuration, it is possible to form the surface layer 2 or backing layer 3 of natural fiber.

In this case, compared to the case where both the surface layer 2 and backing layer 3 are composed of fabric of thermoplastic resin and/or thermosetting resin, an adhesion strength of the surface layer 2 and backing layer 3 is liable to be lowered. To reinforce the adhesion strength, a sheet material made of a thermoplastic resin, thermosetting resin, and resin containing foaming agent, powder made of these resins, or joint medium of fabric fiber may be provided on a joint surface of the surface layer 2 and backing layer 3. Thereby, the surface layer and backing layer can be connected to each other assuredly in compression molding.

Alternatively, resin powder and joint medium of fabric fiber may be directly provided on one or both of the surface layer 2 and backing layer 3, or fiber of low melting point may be mixed in fabric constituting the surface layer 2 and backing layer 3.

The use of resin containing foaming agent is advantageous in enhancing flexibility and softness of covering as well as the effect of joint.

The use of joint medium is not limited to the case that natural fiber is used in the surface layer and backing layer, but applicable to, e.g., the case that the surface layer and backing layer are composed of fabric made of a resin. For example, if the surface layer and backing layer are composed of fabric made of resins different from each other, the melting point of resin used in the surface layer is different from the backing layer. As a result, a desirable adhesion strength cannot be obtained in fusing the surface layer and backing layer. In such case, the joint medium is effective in assuredly connecting the surface layer and backing layer.

A covering of the present invention can take any form other than the above mentioned embodiment and alterations according to needs.

For instance, a covering having combined features of the coverings 1 to 1d shown in FIGS. 1 to 9B is obtainable. Specifically, the coverings 1c and 1d in FIGS. 8B and 9B may be provided with the silencer of the coverings 1a, 1a', 1b, 1b' to produce a covering excellent in absorbing sound.

Besides the above coverings, a film composed of polyethylene or polypropylene or a plastic sheet may be placed between the surface layer 2 and backing layer 3. Thereby, water can be prevented from intruding into the backing layer 3, and a waterproof covering can be obtained. Alternatively, the surface layer 2 or backing layer 3 may be mixed with fiber capable of repelling water, thereby preventing water intrusion.

Figure 10:
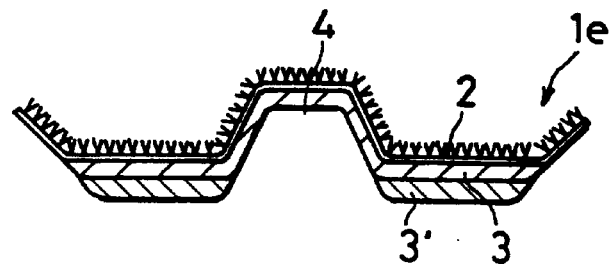
FIG. 10 is a cross sectional view of an altered form of covering obtainable according to the inventive method.

Further, an auxiliary material 3' composed of air containing fabric may be placed between the surface layer 2 and backing layer 3 or at an underside surface of the backing layer 3, and a green web of surface layer and backing layer together with the auxiliary material 3' is shaped to a specified form according to compression molding. Thereby, a covering 1e having a greater thickness at portions other than the curved portion 4 can be obtained, as shown in FIG. 10. The covering 1e is advantageous when a greater thickness is required at some portions of the covering in accordance with the shape of automotive floor, or partially attaining higher effect of sound absorbance and heat insulation is demanded.

The covering in the foregoing embodiment and alterations basically has a multi-layered structure of surface layer 2 and backing layer 3. However, a covering according to the present invention is not limited to the multi-layered covering, but a single-layered covering can attain the same effect as the multi-layered covering.

Figure 11B:
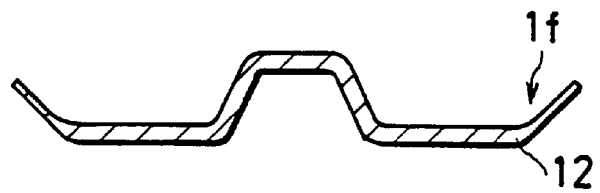
FIG. 11B is a cross sectional view of the covering obtained by the method in FIG. 11A.

Specifically, as shown in FIG. 11A, an air containing fabric layer 12 composed of a thermosetting resin or thermoplastic resin is shaped into a specified form, while being compressed to attain a certain hardness by compression molding. Thereby, a single-layered covering 1f shown in FIG. 11B can be obtained.

In this case, also, the silencer may be placed to give an effect of greater sound absorbance to the covering. Alternatively, various kinds of air containing fabric layers used in the backing layers 7 and 8 shown in FIG. 8B and 9B may be used to produce a covering at a low cost.

Further, a shape of covering, fabric material composing the surface layer and backing layer, or conditions for molding can be arbitrarily selected so as to obtain a favorable covering according to needs. For example, the following is a list of materials suitable for the fabric layer: chemical fiber, inorganic fiber, metallic fiber, natural fiber, mixture thereof, and any fiber mixed with thermoplastic resin, thermosetting resin, adhesive agent, flame retarder (flame retardant fiber), deodorizing agent (deodorizing fiber), water repelling agent (water repelling fiber), antibacterial agent (antibacterial fiber), so-called "Chameleon" fiber for producing "Chameleon" fabric and the like.

In particular, in the case where an antibacterial effect is to be applied to the covering, an antibacterial agent is coated to the backing layer 3 or silk printing is conducted thereto.

The structure of fiber is also not limited to the above, and any structure of fiber may be applicable according to needs. Further, the surface layer 2 and backing layer 3 have the same dimension in width, e.g., as shown in FIG. 2A. However, the backing layer 3 may have a width smaller than the surface layer 2, and a green web of these layers is compressingly shaped according to compression molding.

A sheet member composed of paper, resin or elastic material may be interposed between the surface layer 2 and backing layer 3. Thus, higher sound absorbance can be attained by actively lowering air permeability. Alternatively, instead of interposing the sheet member between the surface layer 2 and backing layer 3, a plurality of backing layers 3 may be prepared and a plurality of sheet materials may be interposed among these backing layers 3.

Though not shown, there may be provided between the surface layer 2 and backing layer 3, a sheet member made of fabric and containing activated carbon therein, deodorizing sheet member containing therein activated carbon, activated clay, zeolite, deodorizing fiber and the like, deodorizing sheet member containing therein metallophthalocyanine and plant extract, or sheet member coated with a fragrant agent. Thereby, a deodorizing and fragrance covering is obtainable.

The deodorizing sheet member can be obtained by constituting a sheet member of fabric made of deodorizing fiber or coating a deodorizing agent to a sheet member. Some methods for deodorizing a sheet member are described hereafter.

Figure 12:
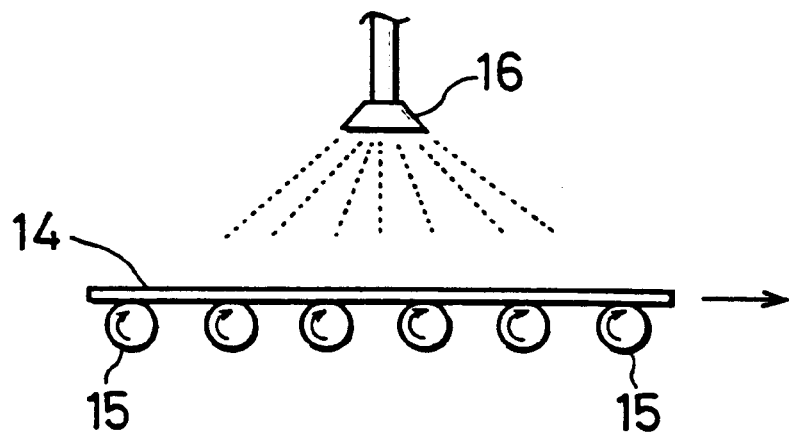
FIG. 12 is a diagram illustrating a method of applying a deodorizing agent to the covering.

FIG. 12 shows a spraying method in which a deodorizing solution is sprayed onto a surface of a sheet member 14 with a spray 16 as the sheet member 14 being transported on a conveyor roller 15. The deodorizing solution is obtained by dissolving a deodorizing agent composed of plant extract and the like in water and a solvent other than water.

Figure 13:
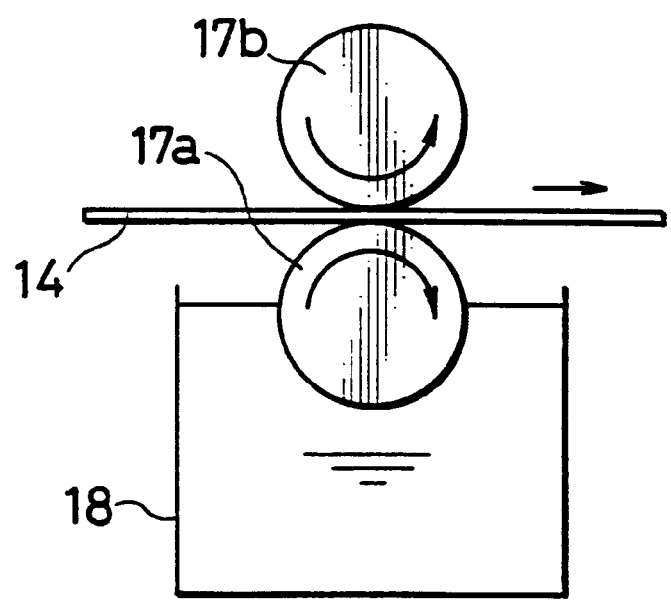
FIG. 13 is a diagram illustrating another method of applying the deodorizing agent to the covering.
Figure 14:
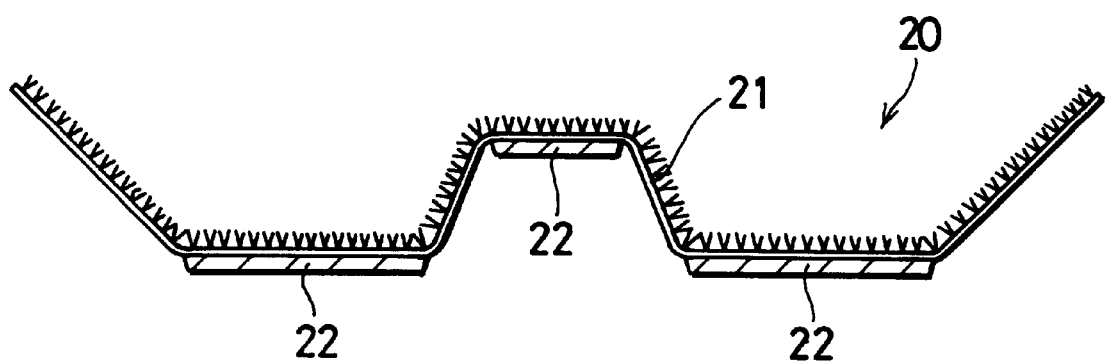
FIG. 14 is a cross sectional view showing a construction of a covering of the prior art.

FIG. 13 shows a so-called "roll-coating" method in which one of rollers 17a and 17b (in the drawing, roller 17a) is partially immersed in a container 18 containing a deodorizing solution therein, and the sheet member 14 is transported between the rollers 17a and 17b in contact with the rollers 17a and 17b in accordance with a rotation thereof. According to this method, as the sheet member 14 is transported forward, the deodorizing agent is coated to the sheet member 14 in contact with the roller 17a which is partially immersed in the container 18.

Further, though not shown, dipping method can be conducted in which a sheet member is dipped in a container containing a liquid-type deodorizing agent. The sheet member having been coated with the deodorizing agent according to the dipping method is heat-dried and transported to a press section. For example, the sheet member with the deodorizing agent coated thereon is transported to a hot press section to be heat-dried and pressed, or first transported to a heating section to be heat-dried and then to the press section to be pressed.

In the foregoing embodiment and alterations, a covering according to the present invention is to be placed on a floor portion of an automotive vehicle. However, the inventive covering may be used for a door, trunk, ceiling, rear package, seat trimming, etc. of automotive vehicles, and any transportation means other than the automotive vehicles, e.g., ships and airplanes. Furthermore, the inventive covering may be adaptable for a ceiling, wall, floor, sofa and the like used in buildings such as houses, factories, and stores.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A method for producing a covering, comprising:

placing a green web including an air-containing fabric layer having a first thickness and a surface layer in a mold having a predetermined shape; and compressing the green web into the predetermined shape such that the air-containing fabric layer and the surface layer unite to each other while the air-containing fabric layer reduces to a second thickness smaller than the first thickness, the compressed green web having a solidity that holds the predetermined shape, wherein the mold includes a pair of a male member and a female member, and the mold has been heated to a predetermined temperature.

2. A method for producing a covering, comprising:

placing a green web including an air-containing fabric layer having a first thickness and a surface layer in a mold having a predetermined shape; and compressing the green web into the predetermined shape such that the air-containing fabric layer and the surface layer unite to each other while the air-containing fabric layer reduces to a second thickness smaller than the first thickness, the compressed green web having a solidity that holds the predetermined shape, wherein the mold includes a pair of a male member and a female member, and the green web is heated to a predetermined temperature before the compressing.

3. A method as defined in claim 2, wherein at least one of the layers includes an adhesive material comprising thermosetting resin.

4. A method as defined in claim 2, wherein at least one of the layers includes an adhesive material comprising thermoplastic resin.

5. A method as defined in claim 2, wherein at least one of the layers includes an adhesive material comprising foam resin.

6. A method for producing a covering, comprising:

placing a green web including an air-containing fabric layer having a first thickness and a surface layer in a mold having a predetermined shape; and compressing the green web into the predetermined shape such that the air-containing fabric layer and the surface layer unite to each other while the air-containing fabric layer reduces to a second thickness smaller than the first thickness, the compressed green web having a solidity that holds the predetermined shape, wherein the mold includes a vacuum device for compressingly drawing the green web onto a molding surface of the mold, and the green web is heated to a predetermined temperature before the compressing.

7. A method for producing a covering, comprising:

placing a green web including an air-containing fabric layer having a first thickness and a surface layer in a mold having a predetermined shape; and compressing the green web into the predetermined shape such that the air-containing fabric layer and the surface layer unite to each other while the air-containing fabric layer reduces to a second thickness smaller than the first thickness, the compressed green web having a solidity that holds the predetermined shape, wherein the mold includes an air supplier for compressingly supply air onto the green web placed in the mold, and the green web is heated to a predetermined temperature before the compressing.

8. A method for producing a covering, comprising:

placing a green web including an air-containing fabric layer having a first thickness and a surface layer in a mold having a predetermined shape; and compressing the green web into the predetermined shape such that the air-containing fabric layer and the surface layer unite to each other while the air-containing fabric layer reduces to a second thickness smaller than the first thickness, the compressed green web having a solidity that holds the predetermined shape, wherein the mold is formed with a hook.

* * * * *